(12) United States Patent
Huang

(10) Patent No.: US 7,639,427 B2
(45) Date of Patent: Dec. 29, 2009

(54) LIGHT COLLECTING DEVICE FOR USE IN A PROJECTION APPARATUS

(75) Inventor: Junejei Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 63 days.

(21) Appl. No.: 11/944,710

(22) Filed: Nov. 26, 2007

(65) Prior Publication Data

US 2009/0009895 A1 Jan. 8, 2009

(30) Foreign Application Priority Data

Jul. 6, 2007 (TW) .............................. 96124726 A

(51) Int. Cl.
G02B 27/14 (2006.01)
G03B 21/28 (2006.01)

(52) U.S. Cl. .......................... 359/629; 359/636; 353/81
(58) Field of Classification Search ................... 353/33, 353/81; 359/629, 636; 362/551, 560; 385/146
See application file for complete search history.

(56) References Cited

U.S. PATENT DOCUMENTS

| | | | | |
|---|---|---|---|---|
| 6,545,814 B2 * | 4/2003 | Bartlett et al. | .............. | 359/636 |
| 6,843,591 B1 | 1/2005 | Peng et al. | | |
| 7,182,468 B1 * | 2/2007 | Haven | .......................... | 353/94 |
| 7,252,393 B1 * | 8/2007 | Ma | .............................. | 353/94 |
| 7,437,034 B2 * | 10/2008 | Gerets et al. | ................... | 385/36 |
| 7,561,337 B2 * | 7/2009 | Wu | .............................. | 359/634 |
| 2001/0048562 A1 | 12/2001 | Bartlett et al. | | |
| 2005/0013142 A1 | 1/2005 | Andersen et al. | | |
| 2005/0174658 A1 | 8/2005 | Long et al. | | |
| 2006/0061981 A1 | 3/2006 | Andersen et al. | | |
| 2007/0014124 A1 | 1/2007 | Gerets et al. | | |

OTHER PUBLICATIONS

Chinese Office Action dated Jun. 5, 2009 issued in related Chinese Patent Application No. 200710141328.

* cited by examiner

*Primary Examiner*—David N Spector
(74) *Attorney, Agent, or Firm*—Grossman, Tucker, Perreault & Pfleger, PLLC

(57) ABSTRACT

A light collecting device adapted for a projection apparatus is provided. The light collecting device at least comprises a light collecting rod that has a body, a longitudinal direction, an incident end, and an emergent end. The incident end comprises an incident surface and a reflecting surface, in which the incident surface is adjacent to the reflecting surface to form an included angle therebetween. The emergent end is opposite to the incident end. Thus, a first light beam passes through the incident surface of the incident end and travels along the body of the light collecting rod towards the emergent end along the longitudinal direction when a second light beam enters into the body of the light collecting rod. The second light beam is reflected by the reflecting surface of the incident end towards the emergent end along the longitudinal direction.

20 Claims, 14 Drawing Sheets

LIGHT COLLECTING DEVICE FOR USE IN A PROJECTION APPARATUS

This application claims the benefit from the priority of Taiwan Patent Application No. 096124726 filed on Jul. 6, 2007, the disclosures of which are incorporated by reference herein in their entirety.

CROSS-REFERENCES TO RELATED APPLICATIONS

Not applicable.

BACKGROUND OF THE INVENTION

1. Field of the Invention

The present invention relates to a light collecting device for a projection apparatus, and particularly, relates to a light collecting device that is easy to manufacture and adapted for a multi-light source projection apparatus.

2. Descriptions of the Related Art

In general, digital light processing (DLP) projection systems comprise many components such as a light source, a color splitter, a light condenser and a digital micromirror device (DMD), which are configured to process light beams to generate an image. In such a DLP projection system, a light collecting rod is typically disposed in the optical path immediately after the light source to integrate the light beams and improve the uniformity thereof. Light beams from the light source will enter the light collecting rod, where they are reflected multiple times before exiting an emergent surface. As a result, the light beams will be integrated and thus, exhibit a better uniformity.

All optical systems are restricted by the étendue conservation law, in which only light falling within a limited light source area and a limited light divergence angle is effective. To improve the brightness of a DLP projection system, a multi-light source illumination structure may be adopted by increasing the number of light sources to improve the brightness of displayed images. Because the limit of étendue conservation law, the added light source area and the light divergent angle must be arranged to be small enough so that the light beams can pass the aperture of the projection lens and fall within the size of the panel.

The design of the light collecting rod will become more critical when light beams from multiple light sources need to be integrated and uniformed. A multi-light source illumination structure for a projection system and a light collecting device thereof have been disclosed in the prior art, as shown in FIGS. 1A and 1B. This conventional illumination structure 1 comprises a first light source 11, a second light source 13, a first light collecting rod 15, a second light collecting rod 17 and a third light collecting rod 19. The first light source 11 is opposite to the second light source 13. The light collecting rods 15, 17, 19 have incident surfaces 151, 171, 191 and emergent surfaces 153, 173, 193, respectively. The first light collecting rod 15 and the second light collecting rod 17 further have reflecting surfaces 155, 175. A first light beam 111 from the first light source 11 enters the first light collecting rod 15 through the incident surface 151, and is reflected by the reflecting surface 155 before exiting the emergent surface 153. Similarly, a second light beam 131 from the second light source 13 enters the second light collecting rod 17 through the incident surface 171, and is reflected by the reflecting surface 175 of the second light collecting rod 17 before exiting the emergent surface 173. After exiting the emergent surfaces 153, 173, the light beams enter the third light collecting rod 19, and then exit the emergent surface 193 for projection onto other optical elements at the back-end. In this way, light beams from two different light sources may be integrated and made uniform. The overall size of the light source system is then reduced due to the elimination of condensing optics.

However, this light collecting device is difficult to manufacture due to its relatively complex structure. Because the three light collecting rods are small, it is difficult to join the first light collecting rod 15 to the second light collecting rod 17 and the third light collecting rod 19. Additionally, since these light collecting rods have poor couplings therebetween, the more times the optical path passes through these couplings, the greater the amount of lost light. Moreover, it is difficult to coat reflective materials on the tiny reflective surfaces 155, 175.

In addition, the DMD of the DLP projection system requires a specific aspect ratio (typically 4:3, 16:9 or 16:10). Restriction of the light sources themselves forces them to be arranged horizontally in the projection apparatus. Therefore, in order for the emergent surface 193 of the light collecting rod to meet this specific aspect ratio of the DMD, and in consideration of the horizontal arrangement of the light sources, additional optical components will be necessary to project the light beams on the DMD precisely. This adds cost and also unnecessarily incurs more light loss.

Moreover, the conventional light collecting device is only adapted to be used in association with two light sources, and will face a challenge if it is used in a multi-light source projection apparatus, thus, lacking flexibility in application.

In summary, although the conventional multi-light source illumination structure can be used in association with two light sources, the light collecting device thereof is difficult to manufacture and suffers from light loss when coupling. Therefore, a light collecting device, which is small, easy to manufacture, has a high light collecting efficiency and that can be used for a multi-light source projection apparatus is desired in this field.

SUMMARY OF THE INVENTION

One objective of this invention is to provide a light collecting device for a projection apparatus. The light collection device can not only integrate light beams from a plurality of light sources to provide a desired brightness for the projection apparatus, but also meet the aspect ratio requirement of the DMD and make efficient use of the internal space of the projection apparatus.

Another objective of this invention is to provide a light collecting device for a projection apparatus, which is simple in structure, easy to manufacture and cost-effective.

Yet a further objective of this invention is to provide a light collecting device that can prevent the optical paths from passing through the optical couplings between the light collecting rods. As a result, this light collecting device can substantially reduce the risk of light loss, thereby, obtaining a higher light coupling efficiency.

The light collecting device of this invention comprises a first light collecting rod which comprises a body, a longitudinal direction, an incident end and an emergent end. The incident end comprises a first incident surface and a first reflecting surface, with the first incident surface is adjacent to the first reflecting surface and forms an included angle therebetween. The emergent end is opposite to the incident end. A first light beam is adapted to pass through the first incident surface of the incident end and travel in the body of the first light collecting rod toward the emergent end along the longitudinal direction. A second light beam is adapted to enter the body of the first light collecting rod and be reflected by the first reflecting surface of the incident end and travel towards the emergent end along the longitudinal direction.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1A:
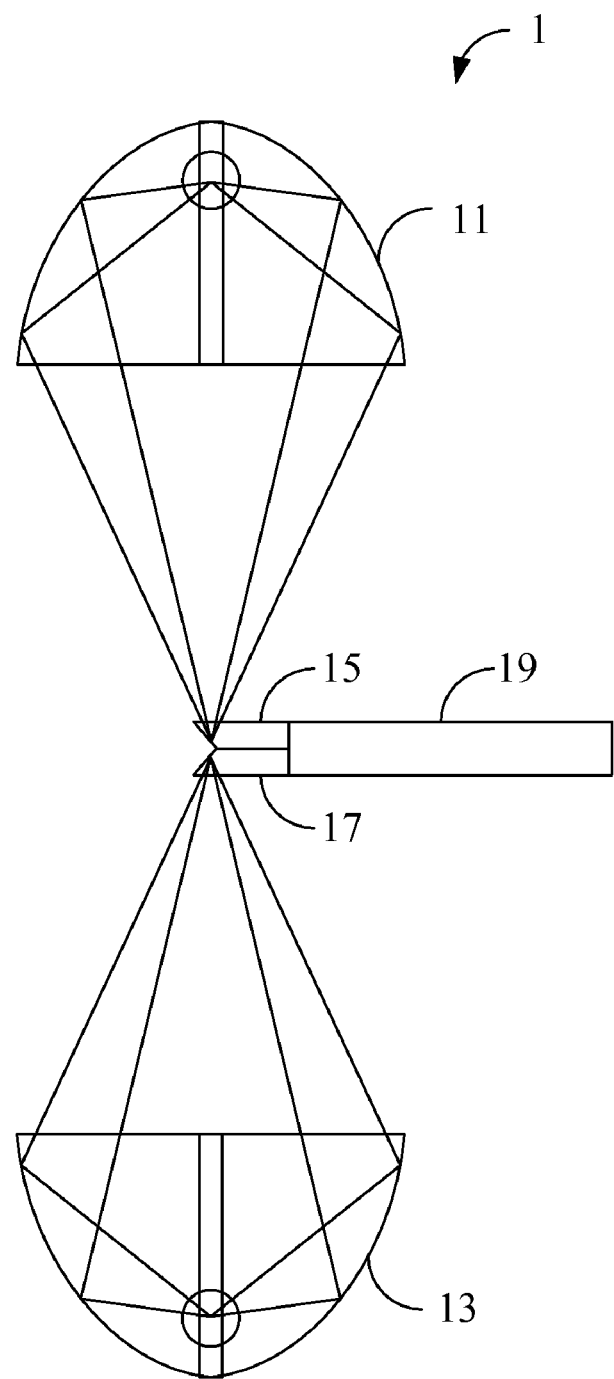
FIG. 1A is a schematic view of the arrangement of a light collecting device and light sources in the prior art.
Figure 1B:
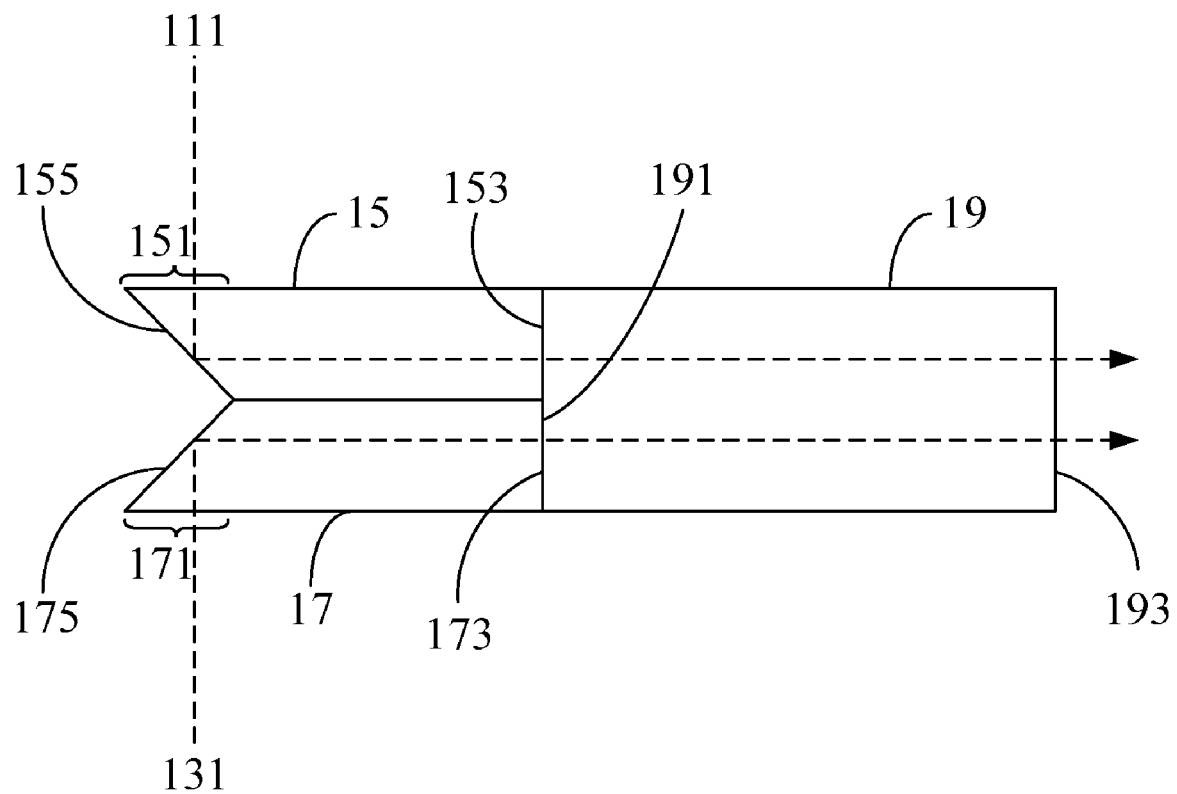
FIG. 1B is an enlarged schematic view of the conventional light collecting device shown in FIG. 1A.
Figure 2A:
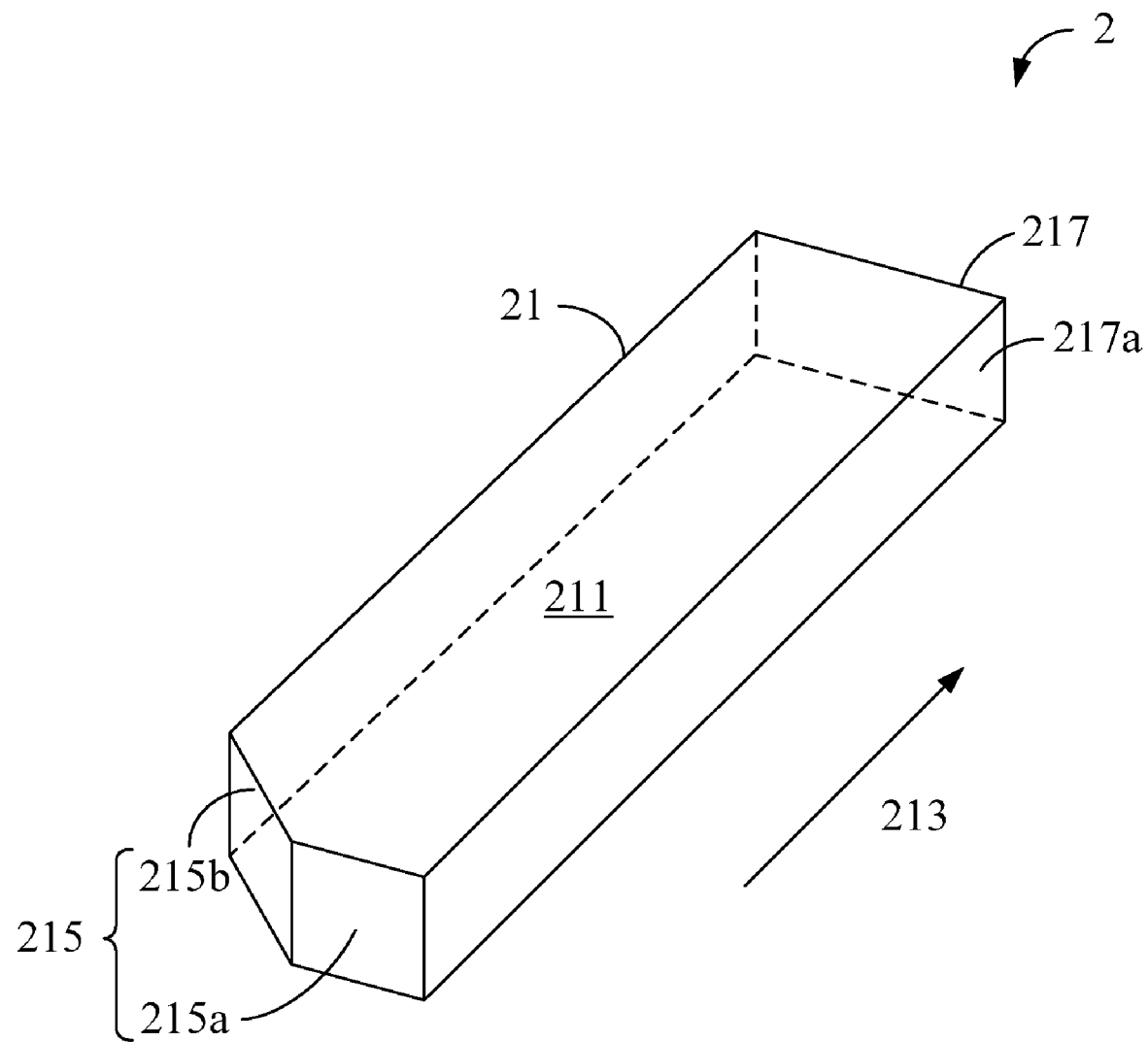
FIG. 2A is a schematic perspective view of a light collecting device in accordance with the first embodiment of this invention.
Figure 2B:
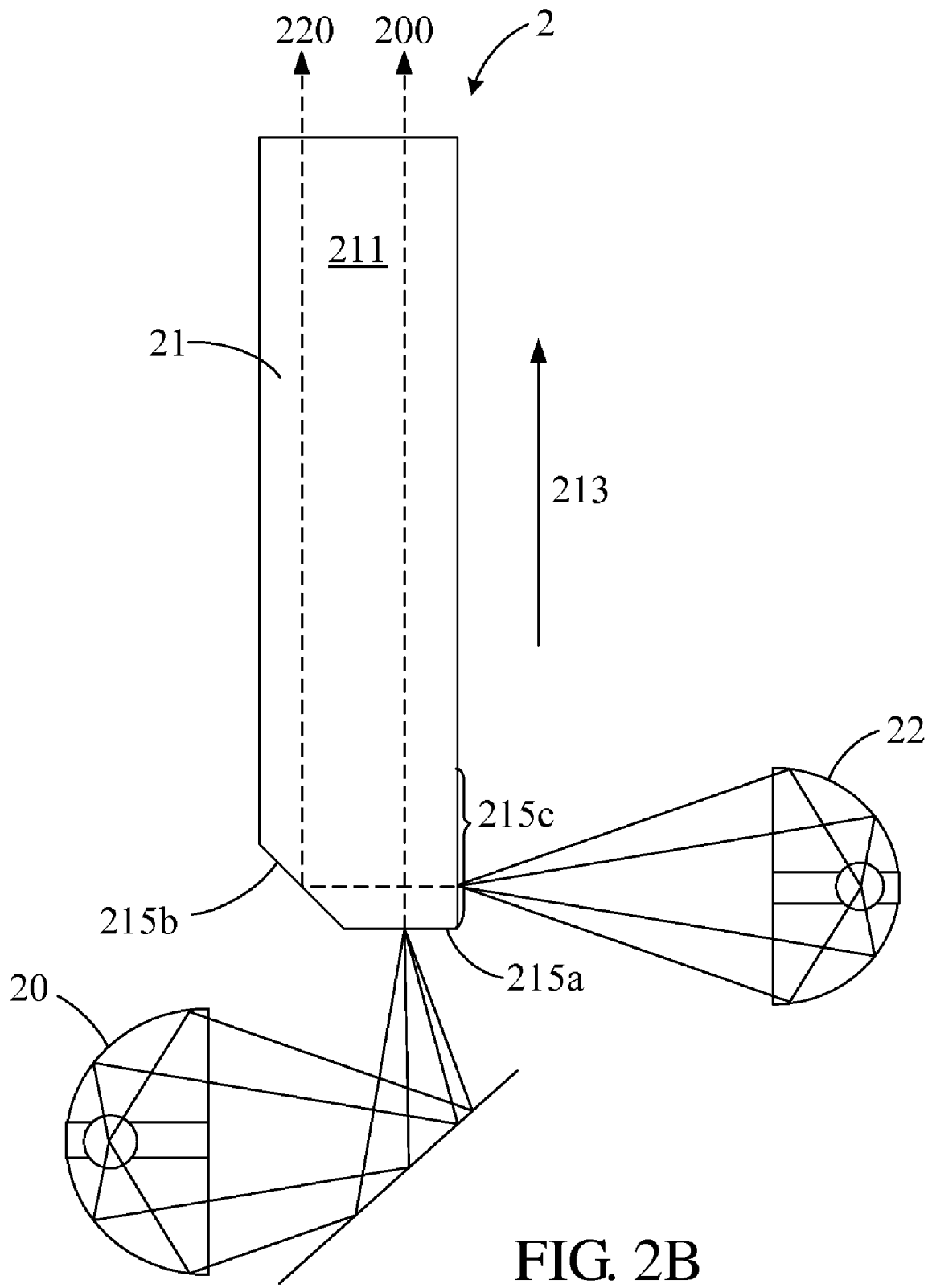
FIG. 2B is a schematic view of the light paths of the light collecting device shown in FIG. 2A in combination with light sources.

A light collecting device for a projection apparatus is disclosed in this invention, an embodiment of which is depicted in FIGS. 2A and 2B. The projection apparatus (not shown) comprises a light collecting device 2, a first light source 20, and a second light source 22. A perspective view of the light collecting device 2 is depicted in FIG. 2A, and a top view of the light collecting device 2 in combination with the light sources is depicted in FIG. 2B. It should be noted that these figures are intended to schematically depict relationships among various elements, rather than to limit the dimensions thereof. The light collecting device 2 comprises a first light collecting rod 21, which is configured to collect and make the light beams emitted from the first light source 20 and the second light source 22 of the projection apparatus uniform. Additionally, both the first light source 20 and the second light source 22 are ultra high pressure (UHP) lamps in this embodiment. However, they are not limited thereto, and other kinds of light sources may be employed instead.

The first light collecting rod 21 comprises a body 211, a longitudinal direction 213, an incident end 215, and an emergent end 217 opposite to the incident end 215. The body 211 extends along the longitudinal direction 213; the incident end 215 is defined at an end of the body 211, and comprises a first incident surface 215a, a first reflecting surface 215b, and a second incident surface 215c. The emergent end 217 comprises a first emergent surface 217a. The first incident surface 215a is adjacent to the first reflecting surface 215b to form an included angle therebetween. The second incident surface 215c is perpendicular to the first incident surface 215a and obliquely opposite to the first reflecting surface 215b. In this embodiment, the first reflecting surface 215b has a layer of reflective material coated thereon to provide reflection.

A first light beam 200 from the first light source 20 is adapted to pass through the first incident surface 215a of the incident end 215 and travel in the body 211 of the first light collecting rod 21 towards the emergent end 217 along the longitudinal direction 213. On the other hand, a second light beam 220 from the second light source 22 first enters the body 211 of the first light collecting rod 21 through the second incident surface 215c, and is reflected by the first reflecting surface 215b of the incident end 215 to change its traveling direction in the longitudinal direction 213 towards the emergent end 217. As a result, the first light beam 200 and the second light beam 220 are uniform. It should be noted that in this embodiment, the light beam from each light source comprises a chief ray and a marginal ray, and for purposes of description, the mentioned explanation will be made only with reference to the chief ray and its traveling direction.

Figure 3A:
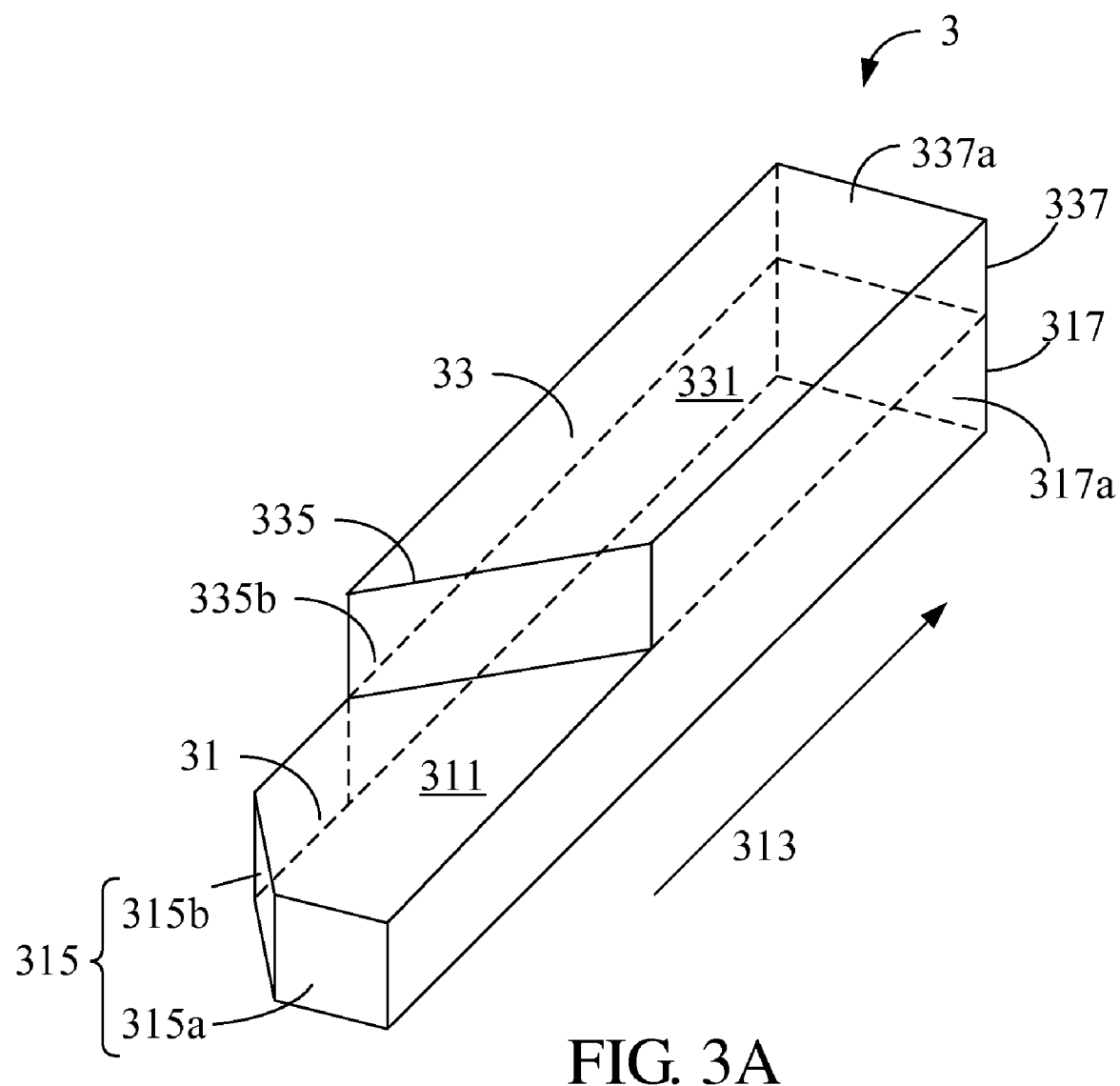
FIG. 3A is a schematic perspective view of a light collecting device in accordance with the second embodiment of this invention.
Figure 3B:
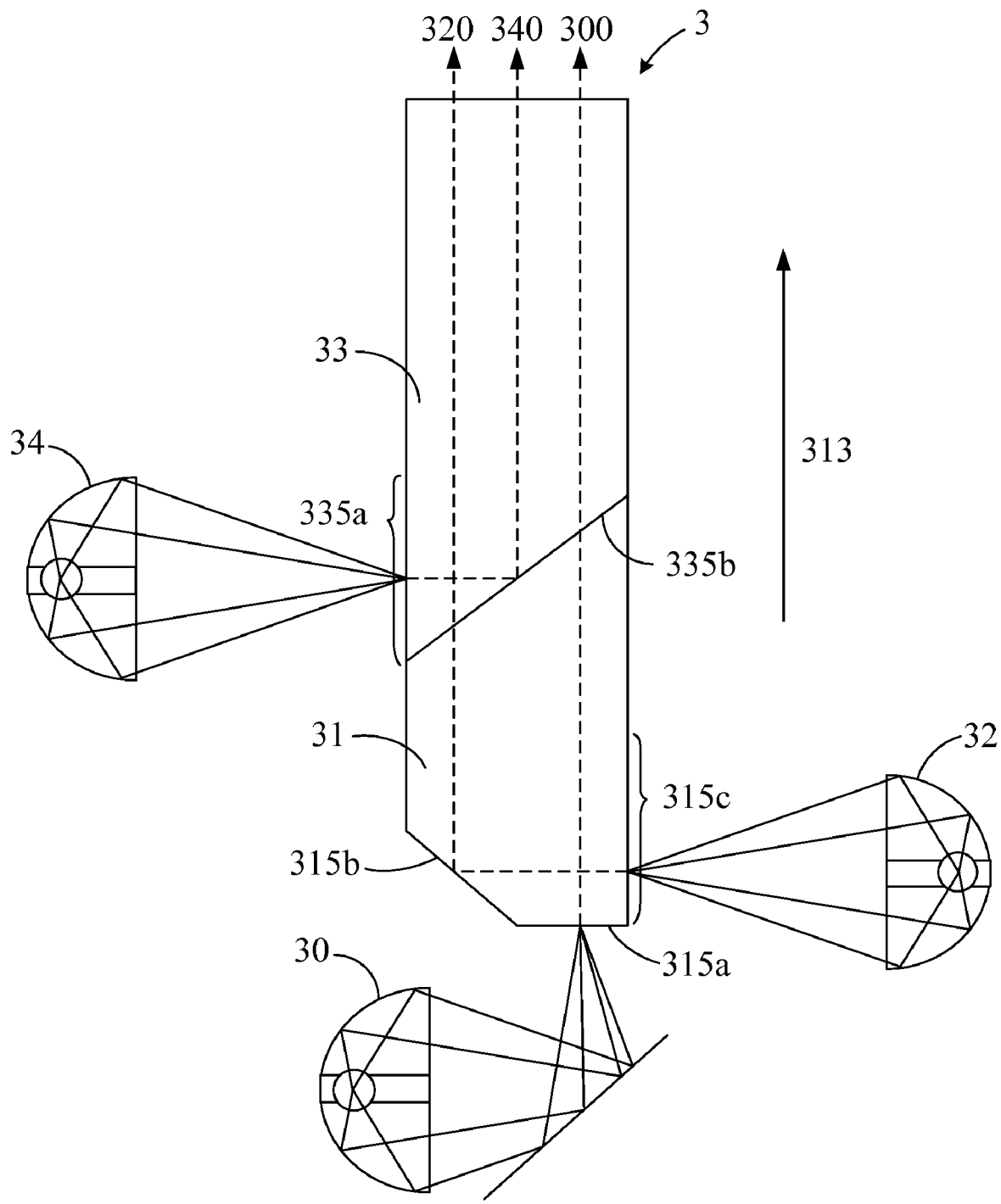
FIG. 3B is a schematic view of the light paths of the light collecting device shown in FIG. 3A in combination with the light sources.

In the second embodiment of this invention, an additional light collecting rod incorporated with a multi-light source is further formed and based upon the first light collecting rod 21 of the first embodiment. The projection apparatus (not shown) comprises a light collecting device 3, a first light source 30, a second light source 32, and a third light source 34. The perspective view of the light collecting device 3 is depicted in FIG. 3A, while the top view of the light collecting device 3 in combination with the light sources is depicted in FIG. 3B. The light collecting device 3 comprises the first light collecting rod 31 and second light collecting rod 33. The first light collecting rod 31 is configured to collect and make the light beams emitted from the first light source 30 and the second light source 32 of the projection apparatus uniform, while the second light collecting rod 33 is configured to collect and make the light beams emitted from the third light source 34 uniform. The second light collecting rod 33 is disposed adjacent to the first light collecting rod 31, and in this embodiment, each of the first light collecting rod 31 and the second light collecting rod 33 has a chamfer. Similarly, the first light source 30, the second light source 32 and the third light source 34 are all ultra high pressure (UHP) lamps in this embodiment, although they are not limited thereto.

Specifically, the first light collecting rod 31 comprises a first body 311, a longitudinal direction 313, a first incident end 315, and a first emergent end 317 opposite to the first incident end 315. The body 311 extends along the longitudinal direction 313; the first incident end 315 is defined at an end of the body 311, and comprises a first incident surface 315a, a first reflecting surface 315b, and a second incident surface 315c. The first emergent end 317 comprises a first emergent surface 317a. The first incident surface 315a is adjacent to the first reflecting surface 315b and forms an included angle therebetween. The second incident surface 315c is perpendicular to the first incident surface 315a and opposite to the first reflecting surface 315b obliquely. In this embodiment, the first reflecting surface 315b has a layer of reflective material coated thereon to provide reflection.

A first light beam 300 from the first light source 30 is adapted to pass through the first incident surface 315a of the first incident end 315 and travels in the first body 311 of the first light collecting rod 31 towards the first emergent end 317 along the longitudinal direction 313. On the other hand, a second light beam 320 from the second light source 32 first enters into the first light collecting rod 31 through the second incident surface 315c, and is reflected by the first reflecting surface 315b of the first incident end 315 to change its traveling direction along the longitudinal direction 313 and towards the first emergent end 317.

The second light collecting rod 33 comprises a second body 331, a second incident end 335, and a second emergent end 337. The second incident end 335 of the second light collecting rod 33 comprises a third incident surface 335a and a second reflecting surface 335b, while the second emergent end 337 of the second light collecting surface 33 comprises a second emergent surface 337a opposite to the second reflecting surface 335b. The second reflecting surface 335b has a layer of reflective material coated thereon to provide reflection. As a result, a third light beam 340 from the third light source 34 enters the second body 331 of the second light collecting rod 33 through the third incident surface 335a, and is reflected by the second reflecting surface 335b to change its traveling direction along the longitudinal direction 313 towards the second emergent surface 337a.

In this embodiment, the first emergent surface 317a of the first emergent end 317 and the second emergent surface 337a of the second emergent end 337 are coplanar, while the first light collecting rod 31 and the second light collecting rod 33 are formed integrally. Consequently, the first light beam 300 and the second light beam 320 are uniformed within the first light collecting rod 31, while the third light beam 340 is uniformed within the second light collecting rod 33. The uniformed light beams from the two light collecting rods then exit from the same plane. In addition, since the first light beam 300 and the second light beam 320 travel in the same light collecting rod, light loss caused by the coupling portion between the light collecting rods as the conventional light collecting device are avoided. Furthermore, the second light source 32 and the third light source 34 are disposed on opposite sides in an offset way, which reduces the space occupied by the multiple light sources efficiently. Similarly, explanation on various light beams is made with reference to only the chief rays in this embodiment for description purposes.

Figure 4A:
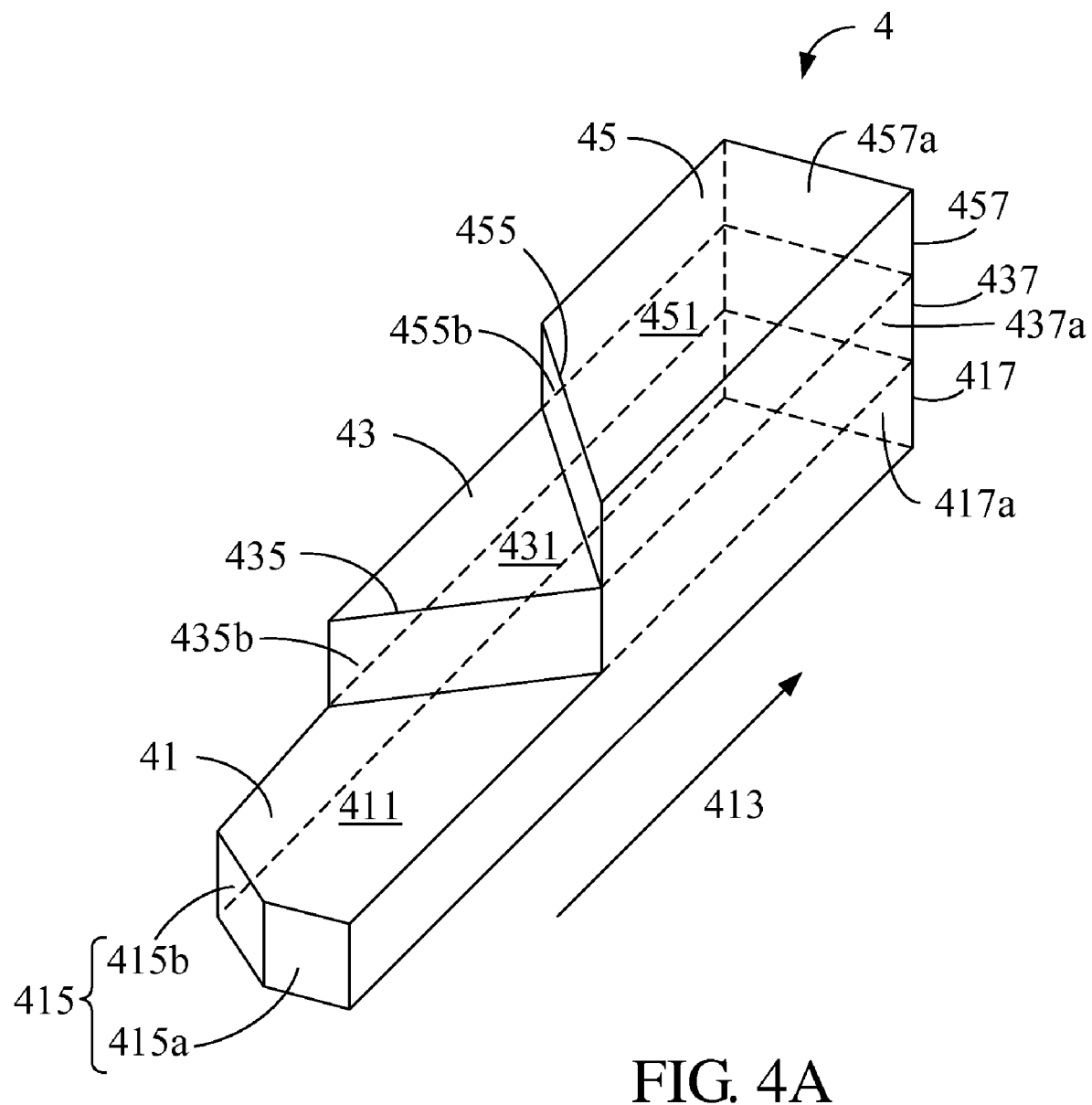
FIG. 4A is a schematic perspective view of a light collecting device in accordance with the third embodiment of this invention.
Figure 4B:
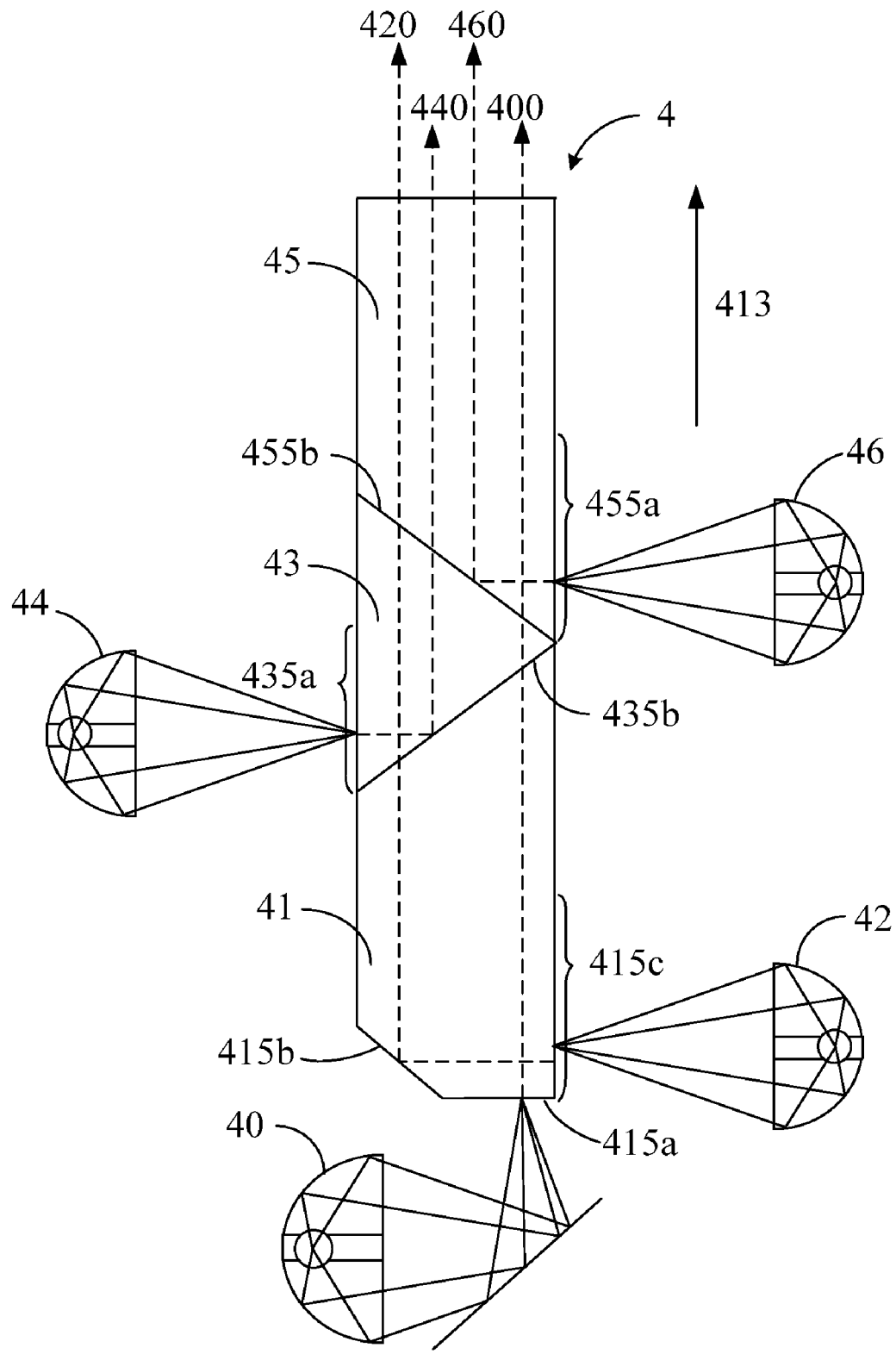
FIG. 4B is a schematic view of the light paths of the light collecting device shown in FIG. 4A in combination with the light sources.

The light collecting device of this invention can be used in association with more light sources. A projection apparatus (not shown) disclosed in the third embodiment of this invention comprises a light collecting device 4, a first light source 40, a second light source 42, a third light source 44, and a fourth light source 46. The perspective view of the light collecting device 4 is depicted in FIG. 4A, and the top view of the light collecting device 4 in combination with the light sources is depicted in FIG. 4B. The light collecting device 4 comprises a first light collecting rod 41, a second light collecting rod 43, and a third light collecting rod 45 for collecting and making the light beams emitted from the first light source 40, the second light source 42, the third light source 44, and the fourth light source 46 of the projection apparatus uniform.

The second light collecting rod 43 is disposed adjacent to the first light collecting rod 41 on one side, while the third light collecting rod 45 is disposed adjacent to the second light collecting rod 43 on the other side. In this embodiment, the first light collecting rod 41, the second light collecting rod 43, and the third light collecting rod 45 all have a chamfer. Similarly, the first light source 40, the second light source 42, the third light source 44, and the fourth light source 46 are all UHP lamps in this embodiment, although they are not limited thereto.

The first light collecting rod 41 comprises a first body 411, a first incident end 415, and a first emergent end 417 opposite to the first incident end 415, and further defines a longitudinal direction 413. The first body 411 extends along the longitudinal direction 413. The first incident end 415 is defined at an end of the first body 411, and comprises a first incident surface 415a, a first reflecting surface 415b, and a second incident surface 415c. The first emergent end 417 comprises a first emergent surface 417a. The first incident surface 415a is adjacent to the first reflecting surface 415b and forms an included angle therebetween. The second incident surface 415c is perpendicular to the first incident surface 415a and obliquely opposite to the first reflecting surface 415b. The first reflecting surface 415b has a layer of reflective material coated thereon to provide reflection.

A first light beam 400 from the first light source 40 is adapted to pass through the first incident surface 415a of the first incident end 415 and travel in the first body 411 of the first light collecting rod 41 towards the first emergent end 417 along the longitudinal direction 413. On the other hand, a second light beam 420 from the second light source 42 first enters the first body 411 through the second incident surface 415c, and is reflected by the first reflecting surface 415b of the first incident end 415. Thus, the second light beam 420 travels towards the first emergent end 417 along the longitudinal direction 414.

The second light collecting rod 43 comprises a second body 431, a second incident end 435, and a second emergent end 437. The second incident end 435 of the second light collecting rod 43 comprises a third incident surface 435a and a second reflecting surface 435b, while the second emergent end 437 of the second light collecting surface 43 comprises a second emergent surface 437a opposite to the second reflecting surface 435b. The second reflecting surface 435b has a layer of reflective material coated thereon to provide reflection. As a result, a third light beam 440 from the third light source 44 enters the second body 431 of the second light collecting rod 43 through the third incident surface 435a. The third light beam 440 reflected by the second reflecting surface 435b travels in the longitudinal direction 413 towards the second emergent surface 437a.

The third light collecting rod 45 comprises a third body 451, a third incident end 455, and a third emergent end 457. The third incident end 455 of the third light collecting rod 45 comprises a fourth incident surface 455a and a third reflecting surface 455b, while the third emergent end 457 of the third light collecting rod 45 comprises a third emergent surface 457a opposite to the third reflecting surface 455b. The third reflecting surface 455b may have a layer of reflective material coated thereon to provide reflection. As a result, the fourth light beam 460 from the fourth light source 46 enters the third body 451 of the third light collecting rod 45 through the fourth incident surface 455a. The fourth light beam 460 reflected by the third reflecting surface 455b travels in the longitudinal direction 413 towards the third emergent surface 457a.

In this embodiment, the first emergent surface 417a of the first emergent end 417, the second emergent surface 437a of the second emergent end 437, and the third emergent surface 457a of the third emergent end 457 are coplanar. The first light collecting rod 41, the second light collecting rod 43, and the third light collecting rod 45 are formed integrally. Consequently, the first light beam 400 and the second light beam 420 are made uniform within the first light collecting rod 41, while the third light beam 440 and the fourth light beam 460 are made uniform within the second light collecting rod 43 and the third light collecting rod 45, respectively. The uniformed light beams from the three light collecting rods then exit from the same plane. In addition, since the first light beam 400 and the second light beam 420 travel in the same light collecting rod, light loss caused by the coupling portion between the light collecting rods as the conventional light collecting device are avoided. Furthermore, the second light source 42, the third light source 44, and the fourth light source 46 are disposed on opposite sides in an offset way, which reduces the space occupied by the multiple light sources efficiently. Similarly, explanations about various light beams are made with reference to only the chief rays in this embodiment.

Figure 5:
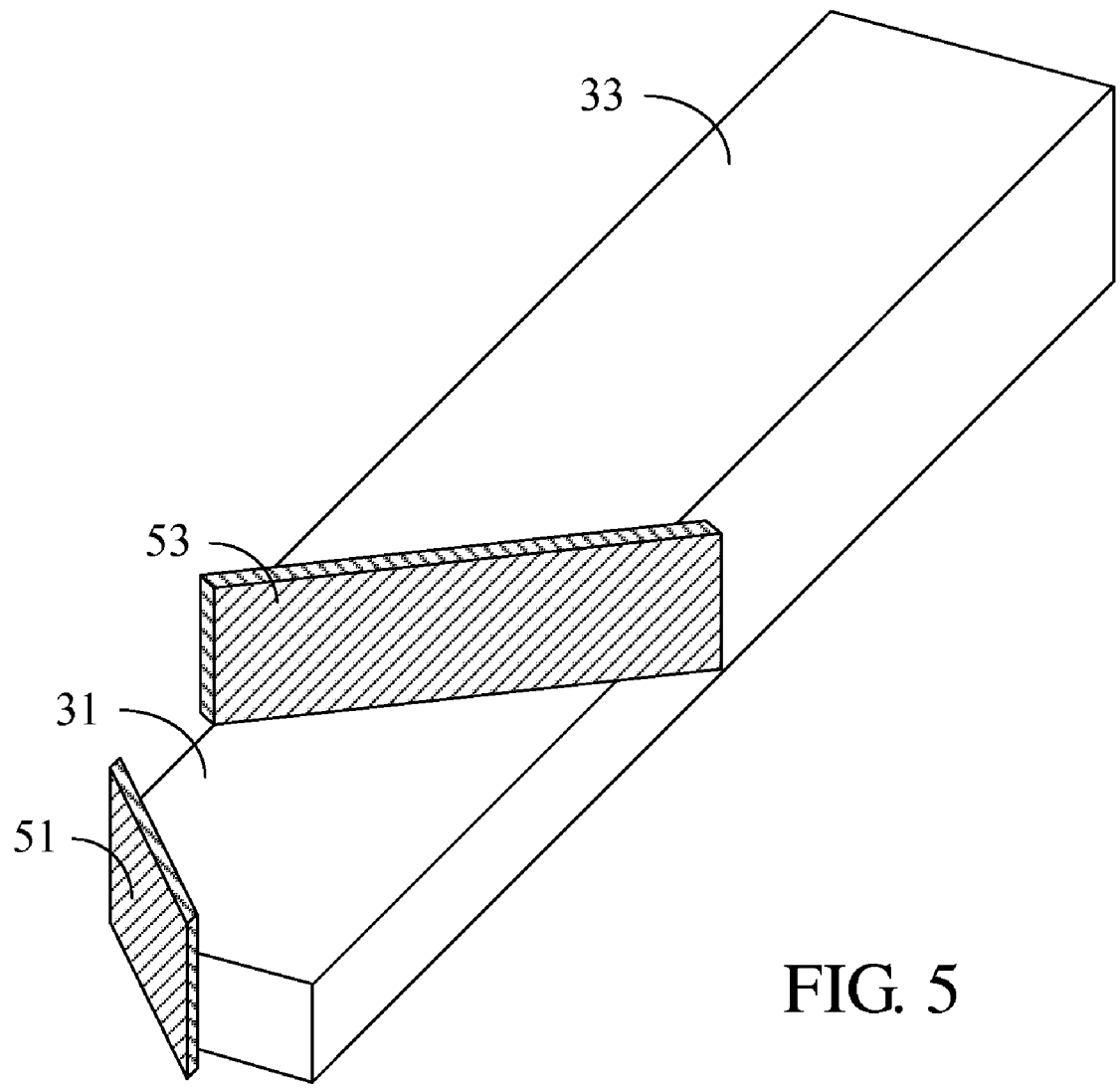
FIG. 5 is a schematic perspective view of another implementation aspect of the light collecting device shown in FIG. 3A.

It should be noted that each of the reflective material layers coated on the reflecting surfaces in the above embodiments may be replaced by a reflective mirror. As shown in FIG. 5, in the second embodiment, the first reflective mirror 51 may be disposed on the first reflecting surface 315b to facilitate the reflection of the light beams, and a second reflective mirror 53 may be disposed on the second reflecting surface 335b to facilitate the reflection of the light beams. Alternatively, the light collecting devices may also be coated with a layer of reflective material and disposed with a reflective mirror.

Figure 6A:
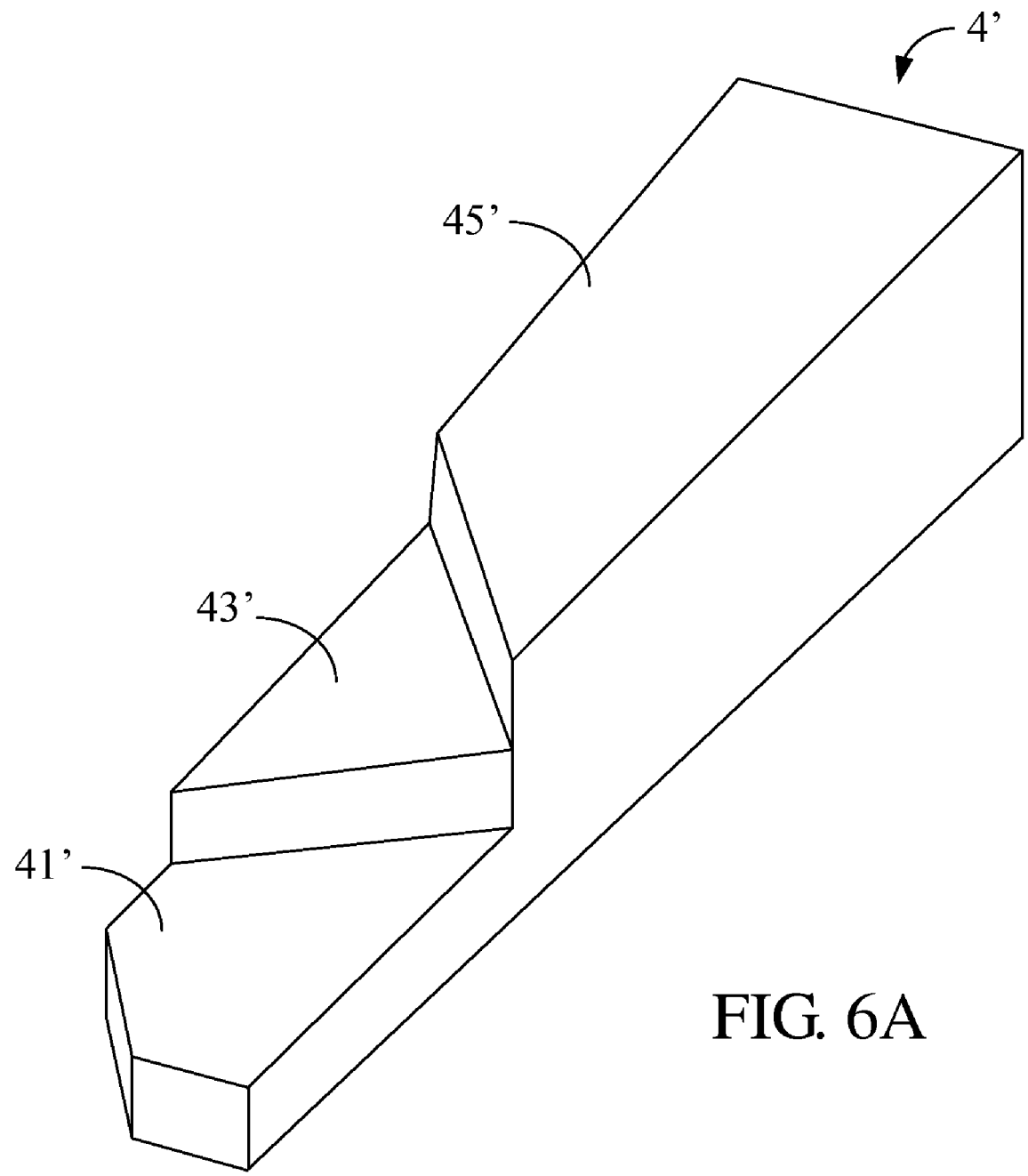
FIG. 6A is a schematic perspective view of another implementation aspect of the light collecting device shown in FIG. 4A.
Figure 6B:
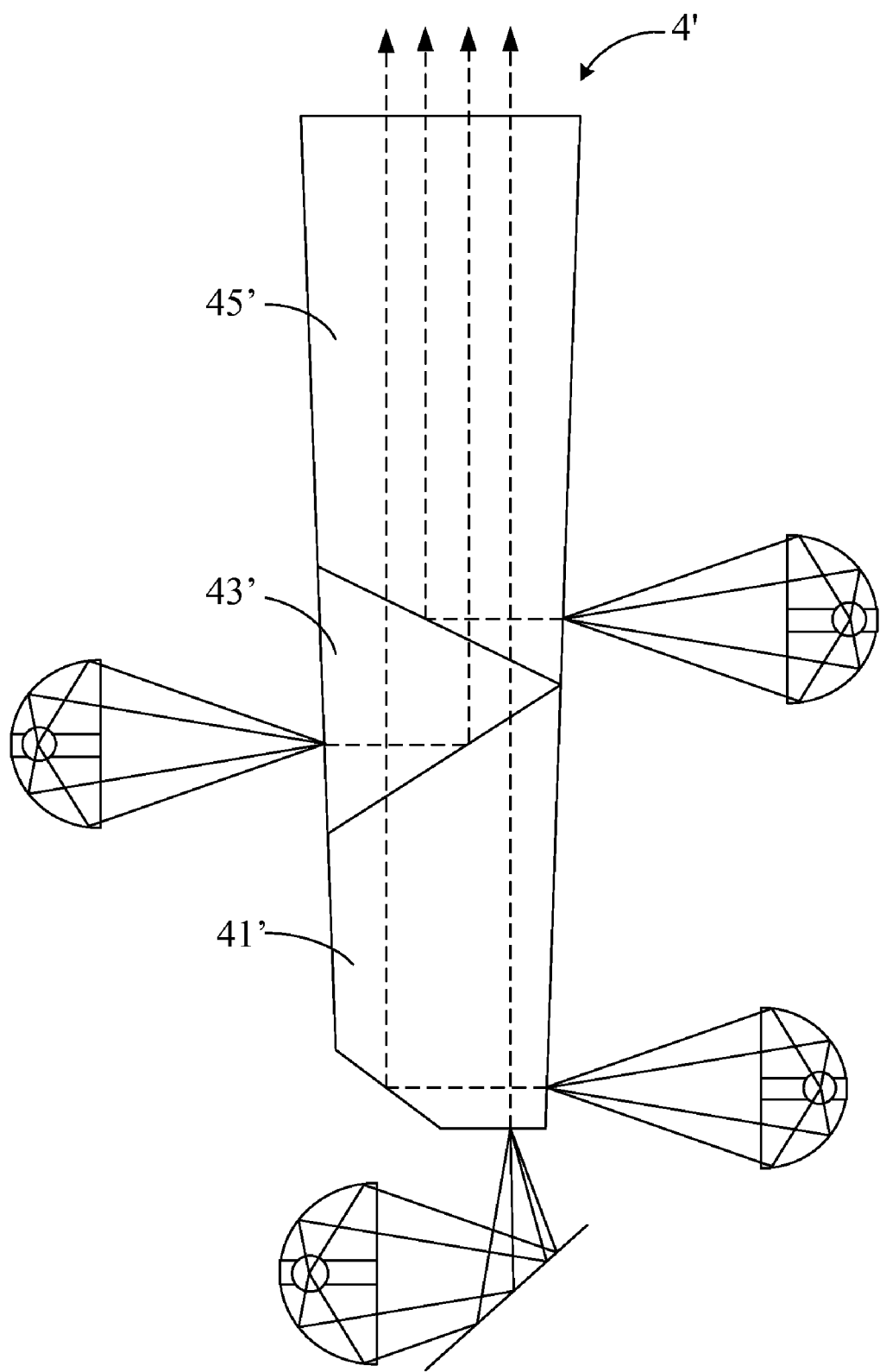
FIG. 6B is a schematic view of the light paths of the light collecting device shown in FIG. 6A in combination with the light sources.

If the light beam distribution of the light collecting devices at the emergent surfaces matches with the aspect ratio of the DMDs, another implementation should be considered. FIG. 6A depicts a perspective view of this implementation using the third embodiment as an example. FIG. 6B depicts a top view of the light collecting device 4' in combination with the light sources. A first light collecting rod 41', a second light collecting rod 43', and a third light collecting rod 45' as a whole take on a pyramidal form with a rectangular cross-section, the area of which increases from respective incident ends to respective emergent ends along the longitudinal direction. The first incident surface and the reflecting surfaces (corresponding to the first reflecting surface 415b, the second reflecting surface 435b, and the third reflecting surface 455b in FIG. 4A) are projected to a plane perpendicular to the longitudinal direction to define a first area. The emergent surfaces (corresponding to the first emergent surface 417a, the second emergent surface 437a and the third emergent surface 457a in FIG. 4A) are projected to the plane to define a second area which is greater than the first area. Briefly speaking, the projection area of the incident end of the light collecting device 4' is smaller than that of the emergent end.

Figure 7A:
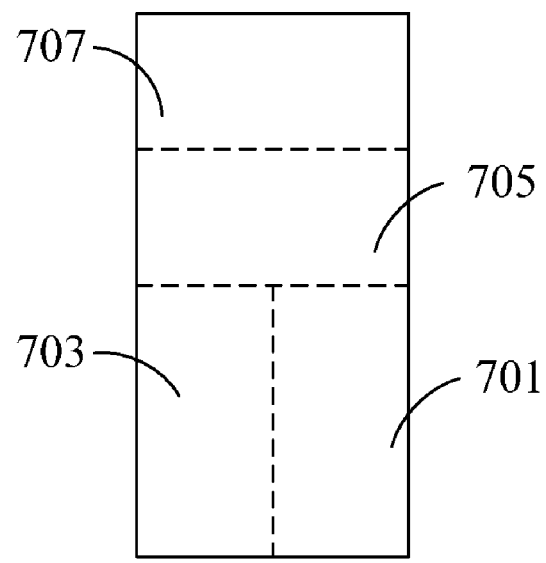
FIG. 7A is a schematic view of projection areas of an incident end of the light collecting device shown in FIG. 6A.
Figure 7B:
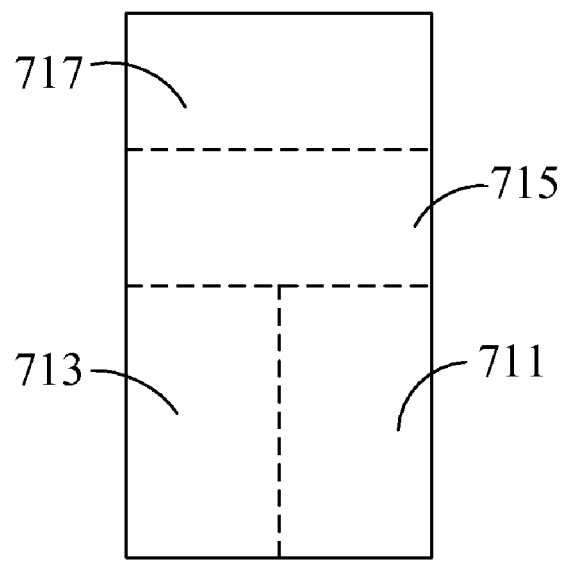
FIG. 7B is a schematic view of the projection areas of the emergent end of the light collecting device shown in FIG. 6A.

More specifically, FIG. 7A is a schematic view of the projection areas of the incident end of the light collecting device, while FIG. 7B is a schematic view of the projection areas of the emergent end of the light collecting device. Projection areas 701, 703, 705, 707 formed by the first incident surface 415a, the first reflecting surface 415b, the second reflecting surface 435b, and the third reflecting surface 455b constitute a rectangle with an aspect ratio of 2:1. Since projection areas 711, 713, 715, 717 formed by the emergent ends (emergent surfaces) of the light collecting rods increase in equal percentages, they also constitute a rectangle with an aspect ratio of 2:1. Of course, the aspect ratio formed by the incident end and the emergent end may alternatively be 4:3, 16:9 or 16:10 to adapt to various specifications of the DMDs.

Alternatively, the projection areas of the incident end may constitute a rectangle with an aspect ratio of 16:8, while those of the emergent end constitute a rectangle with an aspect ratio of 16:9. In this implementation, the preferable aspect ratio of the emergent end can be obtained by employing a tapering or enlarging light collecting device depending on the specific specifications of the cooperating DMDs, regardless of the dimensions of the incident end. Implementations with different aspect ratios may readily occur to those skilled in the art.

Figure 8A:
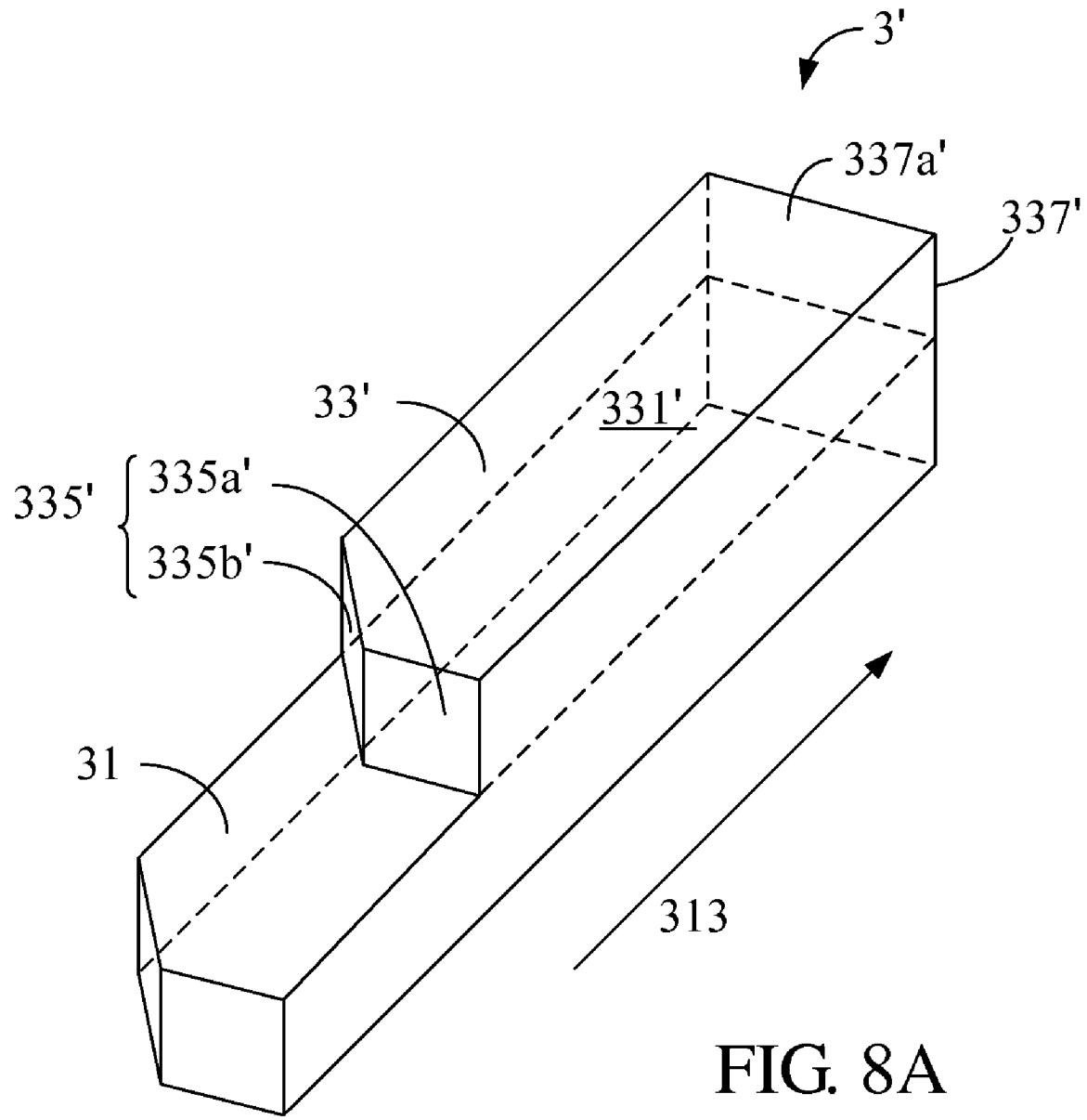
FIG. 8A is a schematic perspective view of still a further implementation aspect of the light collecting device shown in FIG. 3A.
Figure 8B:
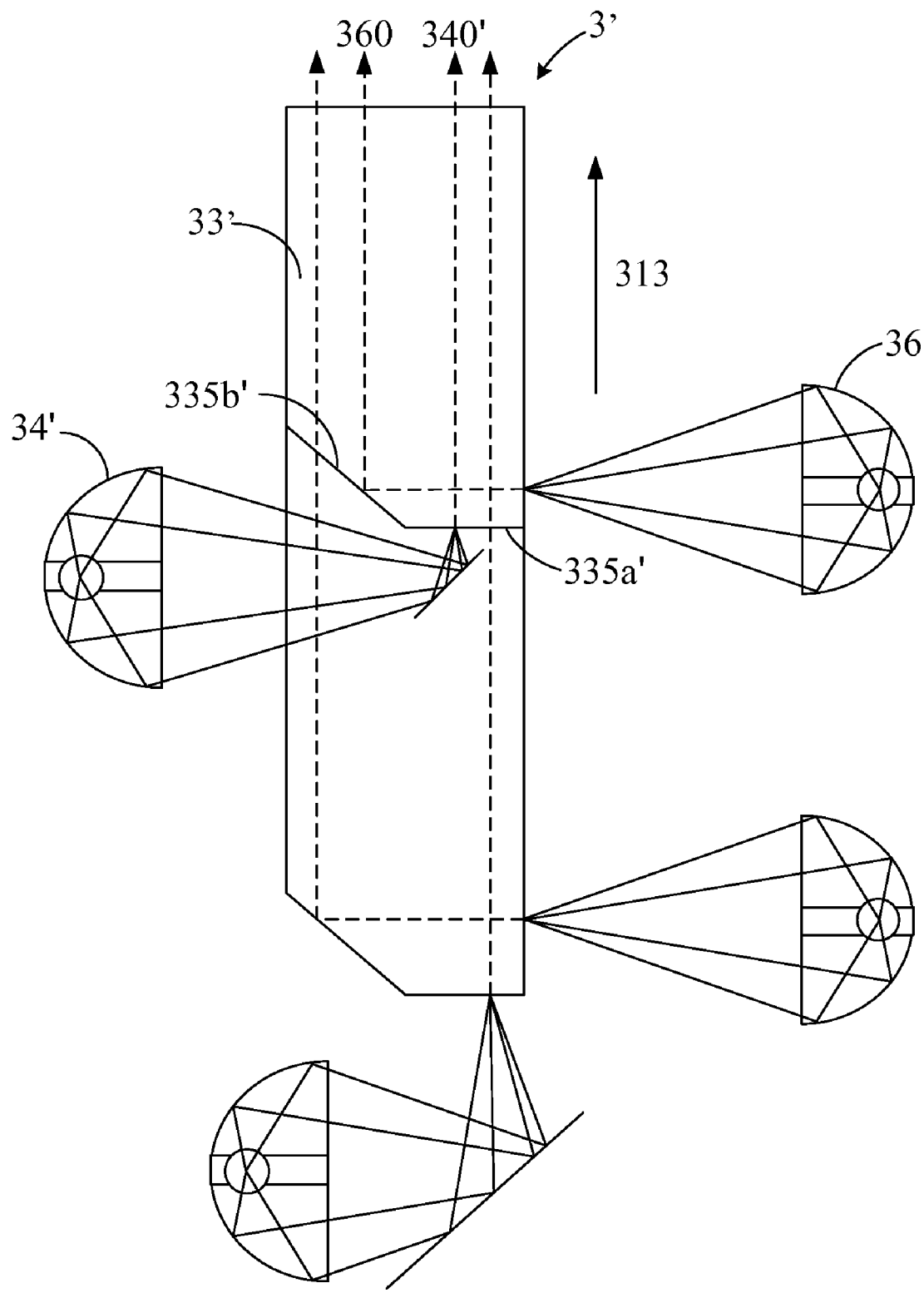
FIG. 8B is a schematic view of the light paths of the light collecting device shown in FIG. 8A in combination with the light sources.

In addition to the configurations of the second light collecting rod and the third light collecting rod as described in the above embodiments, the light collecting rods disposed above the first light collecting rod (including but not limited to the second and/or the third light collecting rod) may be of other structures. For example, they may have the same shape as the first light collecting rod of the above embodiments. For example, FIG. 8A depicts a perspective view of such an implementation in the second embodiment, while FIG. 8B depicts a top view of a light collecting device 3' in combination with the light sources. A second light collecting rod 33' of the light collecting device 3' is also disposed adjacent to the first light collecting rod 31, and similarly comprises a second body 331', a second incident end 335', and a second emergent end 337'.

However, different from the second embodiment, a projection apparatus employing such a light collecting device 3' further comprises a fourth light source 36 apart from a third light source 34'. Additionally, the second incident end 335' of the second light collecting rod 33' comprises a third incident surface 335a' and a second reflecting surface 335b'. The second emergent end 337' comprises a second emergent surface 337a' opposite to the second reflecting surface 335b'. The second reflecting surface 335b' may have a layer of reflective material coated for reflection. As a result, a third light beam 340' from the third light source 34' is adapted to pass through the third incident surface 335a' of the second incident end 335' and travel in the second body 331' of the second light collecting rod 33' towards the second emergent surface 337a' along the longitudinal direction 313. A fourth light beam 360 from the fourth light source 36 may also enter the second body 331' of the second light collecting rod 33'. The fourth light beam 360 is reflected by the second reflecting surface 335b' of the second incident end 335' towards the second emergent surface 337a' of the second emergent end 337' in the longitudinal direction 313.

The light collecting device of this invention may be fabricated by cutting a single light collecting rod or be formed integrally, which only entails a relatively simple manufacturing process. With such a structure, the light coupling efficiency is improved. Moreover, according to this invention, light beams from multiple light sources can be combined into a single light collecting rod. The structural design of this invention allows for a staggered arrangement of light sources, which reduces the space necessary to arrange the light sources significantly. As a result, the size of the projection apparatus is further reduced.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A light collecting device for a projection apparatus, comprising a first light collecting rod, the first light collecting rod comprising:
a longitudinal direction;
a body extending along the longitudinal direction;
an incident end, defined at an end of the body, the incident end comprising a first incident surface and a first reflecting surface, the first incident surface being adjacent to the first reflecting surface to form an included angle therebetween; and
an emergent end, defined at an end opposite to the incident end on the body;
wherein the first light collecting rod is a prism having an cross sectional area increasing from the incident end to the emergent end along the longitudinal direction, a first light beam is adapted to pass through the first incident surface and travel in the body of the first light collecting rod toward the emergent end along the longitudinal direction, and a second light beam is adapted to enter the body of the first light collecting rod and be reflected by the first reflecting surface of the incident end to travel toward the emergent end along the longitudinal direction.

2. The light collecting device of claim 1, wherein the incident end further comprises a second incident surface, in which the second light beam passes through the second incident surface and then enters into the body of the first light collecting rod.

3. The light collecting device of claim 1, wherein the first reflecting surface is coated with a reflective material layer.

4. The light collecting device of claim 1, further comprising a first reflecting mirror disposed onto the first reflecting surface.

5. The light collecting device of claim 1, wherein the first incident surface and the first reflecting surface are projected to a plane perpendicular to the longitudinal direction to define a first area, and the emergent end has a first emergent surface being projected to the plane perpendicular to the longitudinal direction to define a second area, which is greater than the first area.

6. The light collecting device of claim 5, wherein the second area is substantially a rectangle having a length-width ratio of 4:3, 16:9, or 16:10.

7. A light collecting device for a projection apparatus, comprising:
a first light collecting rod, the first light collecting rod comprising:
a longitudinal direction;
a body extending along the longitudinal direction;
an incident end, defined at an end of the body, the incident end comprising a first incident surface and a first reflecting surface, the first incident surface being adjacent to the first reflecting surface to form an included angle therebetween;
an emergent end, defined at an end opposite to the incident end on the body;
wherein a first light beam is adapted to pass through the first incident surface and travel in the body of the first light collecting rod toward the emergent end along the longitudinal direction, and a second light beam is adapted to enter the body of the first light collecting rod and be reflected by the first reflecting surface of the incident end to travel toward the emergent end along the longitudinal direction;
a second light collecting rod adjacent to the first light collecting rod, the second light collecting rod having:
a third incident surface;
a second reflecting surface; and
a second emergent surface opposite to the second reflecting surface,
whereby a third light beam entering a body of the second light collecting rod is reflected by the second reflecting surface and travels towards the second emergent surface along the longitudinal direction.

8. The light collecting device of claim 7, wherein the second reflecting surface is coated with a reflective material layer.

9. The light collecting device of claim 7, further comprising a second reflecting mirror disposed onto the second reflecting surface.

10. The light collecting device of claim 7, wherein the second light collecting rod is a prism.

11. The light collecting device of claim 10, wherein the first incident surface, the first reflecting surface and the second reflecting surface are projected to a plane perpendicular to the longitudinal direction to define a first area, and the emergent end has a first emergent surface and the second emergent surface being projected to the plane perpendicular to the longitudinal direction to define a second area, which is greater than the first area.

12. The light collecting device of claim 11, wherein the second area corresponding to the first emergent surface and the second emergent surface is substantially a rectangle having a length-width ratio of 4:3, 16:9, or 16:10.

13. The light collecting device of claim 7, wherein the first light collecting rod and the second collecting rod are formed integrally.

14. A light collecting device for a projection apparatus, comprising:
a first light collecting rod, comprising
a longitudinal direction;
a body extending along the longitudinal direction;
an incident end, defined at an end of the body, the incident end comprising a first incident surface, a first reflecting surface, and a second incident surface, the first incident surface being adjacent to the first reflecting surface to form an included angle therebetween;
an emergent end, defined at an end opposite to the incident end on the body;
wherein a first light beam is adapted to pass through the first incident surface and travel in the body of the first light collecting rod toward the emergent end along the longitudinal direction, and a second light beam passes through the second incident surface and then enters into the body of the first light collecting rod and be reflected by the first reflecting surface of the incident end to travel toward the emergent end along the longitudinal direction;
a second light collecting rod adjacent to the first light collecting rod, the second light collecting rod having:
a third incident surface;
a second reflecting surface; and
a second emergent surface opposite to the second reflecting surface,
whereby a third light beam passing through the third incident surface into a body of the second light collecting rod travels toward the second emergent surface along the longitudinal direction, and a fourth light beam entering the body of the second light collecting rod is reflected by the second reflecting surface and travels towards the second emergent surface along the longitudinal direction.

15. The light collecting device of claim 14, wherein the second reflecting surface is coated with a reflective material layer.

16. The light collecting device of claim 14, further comprising a second reflecting mirror disposed onto the second reflecting surface.

17. The light collecting device of claim 14, wherein the second light collecting rod is a prism.

18. The light collecting device of claim 17, wherein the first incident surface, the first reflecting surface and the second reflecting surface are projected to a plane perpendicular to the longitudinal direction to define a first area, and the emergent end has a first emergent surface and the second emergent surface being projected to the plane perpendicular to the longitudinal direction to define a second area, which is greater than the first area.

19. The light collecting device of claim 18, wherein the second area corresponding to the first emergent surface and the second emergent surface is substantially a rectangle having a length-width ratio of 4:3, 16:9, or 16:10.

20. The light collecting device of claim 14, wherein the first light collecting rod and the second collecting rod are formed integrally.

\* \* \* \* \*